United States Patent
Brisebois

(10) Patent No.: US 8,385,917 B2
(45) Date of Patent: Feb. 26, 2013

(54) RADIO SELECTION EMPLOYING TRANSIT DATA DETERMINED FROM KINETIC ENERGY GENERATION

(75) Inventor: Arthur Brisebois, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 67 days.

(21) Appl. No.: 12/946,611

(22) Filed: Nov. 15, 2010

(65) Prior Publication Data
US 2012/0122452 A1    May 17, 2012

(51) Int. Cl.
    H04W 4/00 (2009.01)
(52) U.S. Cl. .......... 455/434; 455/414.1; 455/550.1; 455/574; 455/343.2; 370/310.2; 370/311; 370/328; 370/338
(58) Field of Classification Search .......... 455/414.1, 455/418, 432.1, 435.1, 436–444, 456.1–457, 455/550.1, 552.1, 553.1, 41.2, 41.3, 574, 455/343.2–343.5, 434; 370/310.2, 311, 328, 370/331–334, 338
See application file for complete search history.

(56) References Cited

U.S. PATENT DOCUMENTS

| | | | | |
|---|---|---|---|---|
| 6,314,308 B1 * | 11/2001 | Sheynblat et al. | ............ | 455/574 |
| 7,146,130 B2 * | 12/2006 | Hsu et al. | ...................... | 455/3.04 |
| 7,400,600 B2 * | 7/2008 | Mullany et al. | ............... | 370/331 |
| 7,400,886 B2 * | 7/2008 | Sahim et al. | .................. | 455/444 |
| 7,440,755 B2 * | 10/2008 | Balachandran et al. | ... | 455/435.2 |
| 7,496,060 B2 * | 2/2009 | Ramirez et al. | ............... | 370/311 |
| 7,508,781 B2 * | 3/2009 | Liu et al. | ....................... | 370/311 |
| 7,680,469 B2 * | 3/2010 | Fry | ............................. | 455/127.1 |
| 7,924,787 B2 | 4/2011 | Lee et al. | | |
| 8,212,661 B2 | 7/2012 | Shuster et al. | | |
| 2007/0091847 A1 | 4/2007 | Lee | | |
| 2007/0184835 A1 | 8/2007 | Bitran et al. | | |
| 2009/0068970 A1 | 3/2009 | Ahmed et al. | | |
| 2011/0070863 A1 | 3/2011 | Ma et al. | | |
| 2012/0013504 A1 | 1/2012 | Raento et al. | | |

OTHER PUBLICATIONS

Desh, "15 Cellphone chargers that harness kinetic energy for a clean recharge". Copyright Instablogs Network 2009. http://www.greendiary.com/entry/15-cellphone-chargers-that-harness-kinetic-energy-for-a-clean-recharge/ Last accessed Feb. 15, 2011, 10 pages.

Nicole Casal Moore, "Tiny Generators run on good vibrations". Copyright 2009-2011 Futurity.org. http://www.futurity.org/science-technology/tiny-generators-run-on-good-vibrations/ Last accessed Feb. 15, 2011, 5 pages.

(Continued)

*Primary Examiner* — Steve D Agosta
(74) *Attorney, Agent, or Firm* — Turocy & Watson, LLP

(57) ABSTRACT

Systems and techniques for motion adaptive wireless user equipment (UE) in a wireless network are disclosed. These techniques can leverage kinetic information to select a preferred radio (or radio technology) or adapt a reselection scanning interval. This can serve to improve the performance of a UE by reducing the amount of power expended in maintaining an adequate level of connectedness to the wireless network components in the face of UE movement. In a further aspect, kinetic power generators can be employed as a source of UE transit data. Kinetic fingerprints can be compared to UE transit data, e.g., that acquired from a kinetic generator of the UE, to facilitate selection of preferred radios and reselection intervals. In this aspect, radio selection schema and reselection scanning schema can effectively be selected with little to no drain on a UE power source.

20 Claims, 12 Drawing Sheets

OTHER PUBLICATIONS

Noel Mckeegan, "Good vibrations: tiny generator harnesses kinetic energy to power wireless electrical systems". Copyright gizmag 2003-2011. http://www.gizmag.com/go/7584/ Last accessed Feb. 15, 2011, 4 pages.

S.P. Beeby, et al., "Kinetic Energy Harvesting". Act Workshop on Innovative Concepts. ESA/ESTEC Jan. 28-29, 2008. http://www.esa.int/gsp/ACT/events/workshops/ACT-ART-Bridge2Space-Beeby.pdfLast accessed Feb. 15, 2011, 10 pages.

"Directory: Human-Powered". http://peswiki.com/index.php/Directory:Human-Powered Last accessed Feb. 15, 2011, 11 pages.

OA dated Mar. 13, 2012 for U.S. Appl. No. 12/624,643, 28 pages.

Notice of Allowance dated Aug. 8, 2012 for U.S. Appl. No. 12/624,643, 34 pages.

* cited by examiner

RADIO SELECTION EMPLOYING TRANSIT DATA DETERMINED FROM KINETIC ENERGY GENERATION

CROSS-REFERENCE TO RELATED APPLICATIONS

This application is related to U.S. Ser. No. 12/624,643. "MOBILITY-BASED RESELECTION SCAN SCHEDULING" filed Nov. 24, 2009, which is hereby incorporated by reference in its entirety.

TECHNICAL FIELD

The present application relates generally to wireless communications networks, and more particularly, to motion adaptive user equipment (UE) in a wireless communications network environment for selecting a radio technology of the UE and/or scheduling reselection scanning performed by the UE.

BACKGROUND

In wireless communications networks, modern wireless communication devices, e.g., user equipment (UE), support more frequency bands and technologies than ever before. In order to benefit from this available network bandwidth and capacity, each device must be aware of what is available while camping and/or before voice or data calls or other communication transactions are made. In complex multi-technology and frequency band scenarios, associated UE may scan, for example, several different technologies across multiple different frequency bands, which can be beneficial. Moreover, lacking proactive information about available networks, smart network selection techniques can be slowed or be less functional.

According to traditional network scanning techniques, devices periodically scan various frequency bands and technologies. A preferred frequency and radio technology can then be selected and camped on by a device. Such scanning typically requires receiver and battery resources while the UE is otherwise idle. If scanning is too frequent, battery standby time can be reduced. On the other hand, if scanning is too infrequent, the UE can lack an appropriate level of awareness of the surrounding networks and can thus make inappropriate selection decisions. Either result is generally undesirable.

The above-described deficiencies of today's wireless communications technologies are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of the disclosed subject matter in order to provide a basic understanding of some aspects of the disclosed subject matter. This summary is not an extensive overview of the subject disclosure. It is intended to neither identify key or critical elements of the subject disclosure nor delineate the scope of the disclosed subject matter. Its sole purpose is to present some concepts of the disclosed subject matter in a simplified form as a prelude to the more detailed description that is presented later.

One or more embodiments of the disclosed subject matter analyze user equipment (UE) transit data. In a non-limiting aspect of the disclosed subject matter, UE transit data can be analyzed to determine radio selection information. Radio selection information can be related to preferential enablement or preferential disablement of one or more UE radios or radio technologies of the UE. For example, this can allow a wireless radio, e.g., an IEEE 802.xx radio (WiFi), etc., to be turned off and a Bluetooth radio to be turned on based on the movement of the host UE.

In another non-limiting aspect, UE transit data can be analyzed to aid in the defining reselection scanning schedules by providing reselection interval information related to preferential rescanning intervals. This can supplement or replace reselection scanning schedules generated by other means. This can be beneficial where, for example, the granularity of other methods may not be sufficient to provide relevant interval scheduling.

In a further non-limiting aspect, kinetic power generators can be employed as a source of UE transit data. Where a kinetic generator typically generates power when moved, the generator output can be closely correlated to motion. As such, UEs having kinetic generators can employ the output of a kinetic generator as a source of UE transit data. This can be beneficial where the kinetic generator also provides power to the UE because radio selection and/or reselection scanning schema can be accomplished with little to no negative effect on UE resources, e.g., battery life.

Aspects, features, or advantages of the various embodiments of the subject disclosure can be exploited in wireless telecommunication devices, systems or networks. Non-limiting examples of such devices or networks include Femtocell technology, Wi-Fi, e.g., various 802.xx technologies, etc., Worldwide Interoperability for Microwave Access (WiMAX); Enhanced General Packet Radio Service (Enhanced GPRS); Third Generation Partnership Project (3GPP) Long Term Evolution (LTE); 3GPP Universal Mobile Telecommunications System (UMTS); Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rate for GSM Evolution (EDGE) Radio Access Network (RAN) or GERAN; UMTS Terrestrial Radio Access Network (UTRAN); LTE Advanced, femtocell(s), microcell(s), Bluetooth, etc. Additionally, aspects of the disclosed subject matter can include legacy telecommunication technologies.

To the accomplishment of the foregoing and related ends, the disclosed subject matter, then, comprises the features hereinafter fully described. The following description and the annexed drawings set forth in detail certain illustrative aspects of the disclosed subject matter. However, these aspects are indicative of but a few of the various ways in which the principles of the disclosed subject matter may be employed. Other aspects, advantages and novel features of the disclosed subject matter will become apparent from the following detailed description of the disclosed subject matter when considered in conjunction with the drawings.

DETAILED DESCRIPTION

Figure 1:
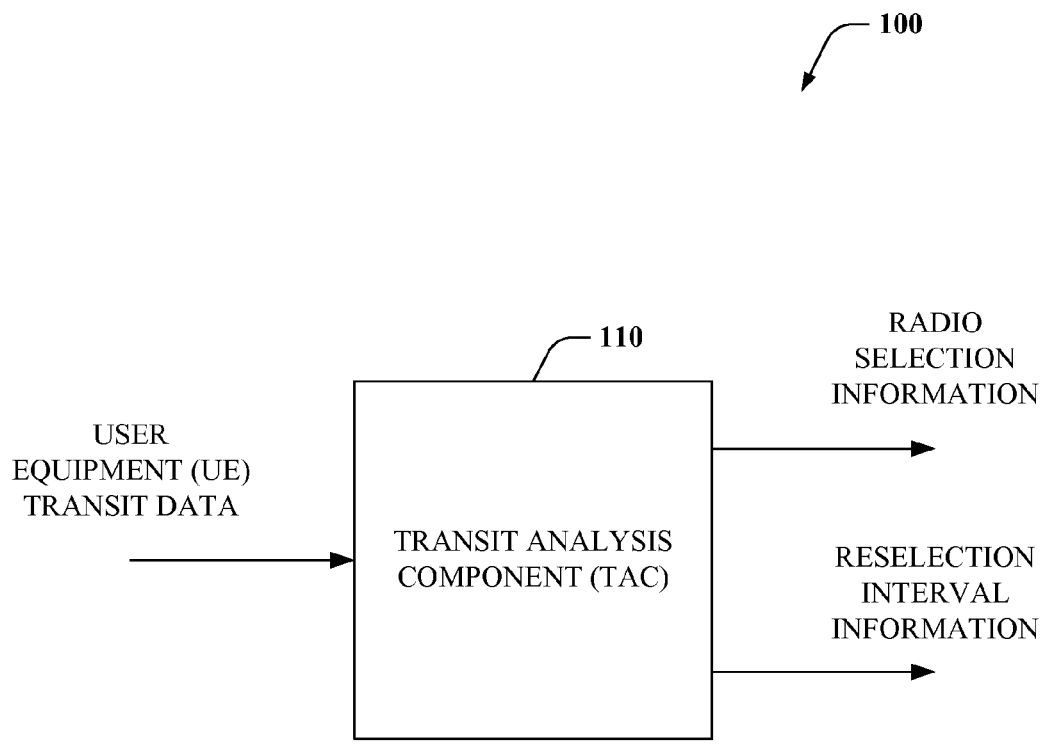
FIG. 1 is a block diagram illustrating a system that can facilitate motion adaptive user equipment selection of at least a radio technology or a reselection interval in accordance with aspects of the disclosed subject matter.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets, e.g., data from one component interacting with another component in a local system, distributed system, and/or across a network such as the Internet with other systems via the signal. As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence, e.g., a capacity to make inference based on complex mathematical formalisms, which can provide simulated vision, sound recognition and so forth.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

FIG. 1 is a block diagram illustrating a system 100 that can facilitate motion adaptive user equipment (UE) selection of at least a radio technology or a reselection interval in accordance with aspects of the disclosed subject matter. As disclosed in related application (U.S. Ser. No. 12/624,643), incorporated herein in the entirety by reference, an architecture can determine a scanning schedule for reselection scanning in connection with a wireless communication network or service, e.g., by tracking UE movement between nodeB locations in a given time interval. These measurements can be employed to calculate a reselection scanning schedule based in part on the UE speed (or lack thereof) through wireless communication network resources. In accordance therewith, the foregoing architecture can include a mobility component that can determine a current mobility pattern for UE, e.g., a change in location for the UE or a speed or velocity for the UE. The mobility pattern can be constructed based upon an examination of a history of cell IDs selected by the UE during recent reselection scans, which can indicate or be representative of UE movement as well as the pattern of movement. In addition, the foregoing architecture can include an assignment component that can determine a reselection scanning schedule for the UE based upon the mobility pattern. In an aspect this can facilitate extended battery life due to fewer reselection scans performed by the UE where said scans are more likely to be redundant, e.g., where there is little or no mobility of the UE.

System 100 illustrates a related system that can employ UE transit data to facilitate selection of reselection interval (which can be considered in determining a reselection scanning schedule as disclosed in related application (U.S. Ser. No. 12/624,643) as disclosed supra) as well as for selecting an radio technology. It is becoming more common for UEs to include multiple radios and/or radio technologies, e.g., radios for CDMA, TDMA, WiFi, Bluetooth, etc., which can be independently controlled to effect communication or data transfer with between the UE and various elements of one or more wireless communications networks. As a non-limiting example, a smartphone can have both a WiFi radio and a cellular radio such that the WiFi radio can be used exclusive of the cellular radio (or vice versa) to effect communications, e.g., email can be accessed over either the cellular or WiFi radios. As each specific radio and/or radio technology may perform better (or worse) than a competing technology for a given set of conditions, selection of the radio/radio technology can afford an improved user experience. For example, where a user is relatively stationary in their office, WiFi can be preferential to a cellular radio, e.g., greater bandwidth, more available resources, lower power consumption, etc., while, in contrast, when a user is moving rapidly down a freeway, e.g., in a bus or taxi, a cellular connection can be preferential, e.g., rapid transitions across a plurality of WiFi resources is generally resource intensive as compared to the longer period of residence afforded by a nodeB.

Whereas system 100 facilitates the selection of radios/radio technologies, an improved user experience can be achieved. System 100 can include transit analysis component (TAC) 110 to analyze UE transit data to facilitate selection of a radio (or radio technology) and/or a reselection interval. For example, where a user is moving rapidly in a train, TAC 110 can determine that the user is moving rapidly and that there is a frequency component to the movement that is associated with train travel, e.g., there is a frequency to the movement of the UE that can come from the train crossing track welds, acceleration/deceleration of a train from/into a station, swaying of a train car during transit, etc. Where train travel is a possibility, TAC 110 can, for example, indicate that an initial scan for a train-car-WiFi connection be made and, where no WiFi is detected, can indicate that the WiFi radio should be powered down to conserve battery life. Further, in the example, TAC 110 can also indicate that the cellular radio remain on subject to a reselection scanning schedule appropriate for train speed movement (or in conjunction with the subject matter for determining a reselection scan as disclosed in related application (U.S. Ser. No. 12/624,643)).

TAC 110 can analyze UE transit data to form a kinetic fingerprint that can be applied in radio selection models to aid in the selection of preferential radios or radio technologies. Further, this kinetic fingerprint can contribute to improved determination of reselection scanning schedules. A kinetic fingerprint can be based on data related to the transit of UEs. As such, a kinetic fingerprint can be based on a wide variety of motion data sources, for example, GPS data, accelerometers, and of course speed calculations between nodeBs for given time intervals. However, each of these data sources generally is associated with further taxing of UE resources. For example, a GPS generally is considered to consume a significant amount of UE power that can rapidly discharge modern UE battery technologies. As such, using GPS can be undesirable. Further, for example, GPS can function poorly inside structures and thus make it undesirable for use in computing radio technology selection and reselection scanning intervals. In an aspect, TAC 110 can be communicatively coupled to a kinetic generator (not illustrated) to provide UE transit data. Further, a kinetic generator can provide UE transit data with minimal depletion of UE resources, e.g., with little or no net battery drain from UE transit data acquisition.

Figure 2:
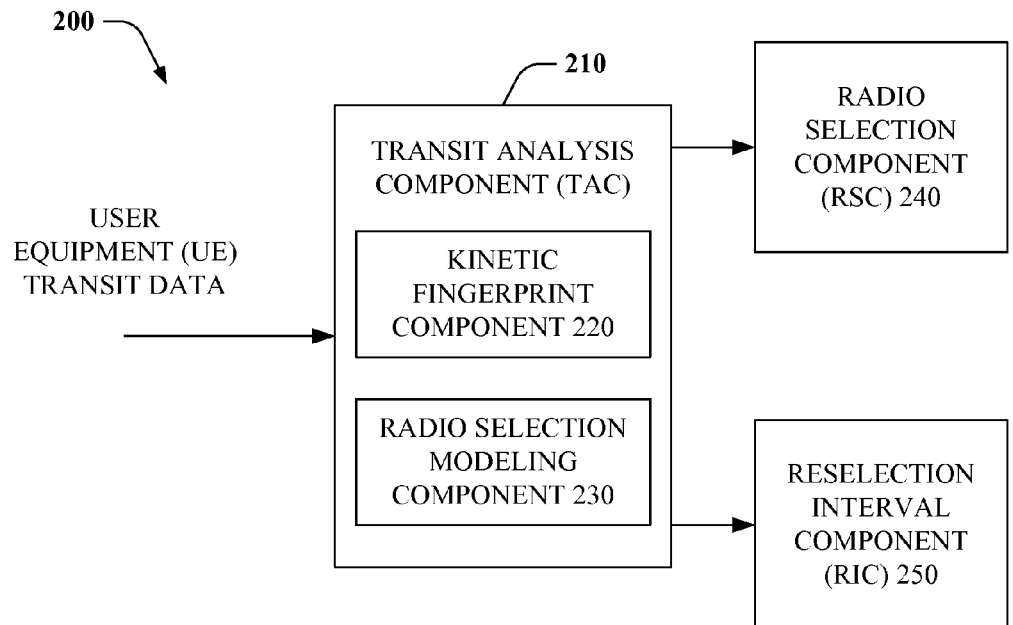
FIG. 2 is a block diagram of a system employing a kinetic fingerprint to select at least a radio technology or a reselection interval in accordance with aspects of the disclosed subject matter.

FIG. 2 is a block diagram of a system 200 employing a kinetic fingerprint to select at least a radio technology or a reselection interval in accordance with aspects of the disclosed subject matter. System 200 can include TAC 210. TAC 210 can be the same as, or similar to, TAC 110. TAC 210 can access UE transit data as disclosed herein above. TAC 210 can include kinetic fingerprint component 220. Kinetic fingerprint component 230 can be employed to determine close matches (or perfect matches) between known (or inferred) UE kinetic patterns and accessed UE transit patterns. Kinetic fingerprint matches can be any UE transit pattern criterion (criteria) that transitions a predetermined criterion (criteria) associated with one or more predetermined UE kinetic patterns. As a non-limiting example, where a UE kinetic pattern for a UE kinetic generator is predetermined to have a regular sinusoidal pattern of power generation with a frequency between 0.5 and 2 Hz, a match can be identified when the UE transit data indicates a 1.2 Hz regular sinusoidal power generation pattern. In contrast for the example, a match can be proscribed where the UE transit pattern is 1.2 Hz but an irregular sinusoidal power generation pattern. The irregular sinusoidal nature can indicate another type of motion, e.g., foot tapping or leg bouncing while seated, etc. One of skill in the art will appreciate that kinetic fingerprints can be inclusive or exclusive of a wide number of characteristics and that all permutations thereof are considered to be within the scope of the present disclosure. For example, a kinetic fingerprint can consider a data source, e.g., model, type, brand, date of manufacture, aging or environmental characteristics, etc., a data type, e.g., voltage, current, temporal, numeric, ratio, instant, historic, etc., a data acquisition window, data acquisition environment, historic data, user preferences user defined data, date reference frame(s), multiple data sources, etc.

TAC 210 can include radio selection modeling component 230. Radio selection modeling component 230 can model preferred radio selections for one or more kinetic fingerprints. As such, given a kinetic fingerprint (or a default fingerprint) radio selection modeling component 230 can aid in designating one or more preferred radio (or radio technology) schema. As a non-limiting example, where a kinetic fingerprint match for sitting at an office desk is indicated, radio selection modeling component 230 can indicate that a WiFi radio should be on with a reselection scan every 5 minutes and a cellular radio should be on with a reselection scan every 60 minutes. As a second non-limiting example, where a kinetic fingerprint match to bus travel is indicated, radio selection modeling component 230 can indicate that a WiFi radio should be turned off (presuming the bus does not have a mobile WiFi system) and that a WAN radio should be turned on with reselection scanning every minute. Numerous other examples can readily be appreciated but are omitted for brevity.

In an aspect, the models employed in radio selection modeling component 230 can be of varying levels of complexity. As a non-limiting example, a model for a stationary UE can indicate a first combination of radios. As a second non-limiting example, a model for a stationary UE, at a particular time of day, in a particular carrier network, can indicate a second combination of radios. In another aspect, the models can be hierarchical. As a non-limiting example, radio selection models can be selected initially for low or high-speed movement, then for a secondary speed indicator, then for a power consumption of radios, then for performance of radios, them for carrier, then for cost, etc.

System 200 can further include radio selection component (RSC) 240. RSC 240 can facilitate selection of preferred radios or radio technologies as disclosed herein. RSC 240 can access a radio selection indicator, e.g., from TAC 210, and can correspondingly attempt to select the indicated radio(s). For example, where a WiFi radio is indicated as preferential by TAC 210, RSC 240 can attempt to select the WiFi radio of the UE. Where the selection is not achieved, e.g., a user has manually turned off the WiFi radio, etc., TAC 210 can be signaled (not illustrated for clarity) and an alternate preferential radio can be selected accordingly.

System 200 can similarly include reselection interval component (RIC) 250. RIC 250 can facilitate indication of a reselection interval. A reselection interval can be employed in generating a reselection scanning schedule as disclosed in related application (U.S. Ser. No. 12/624,643). In an aspect, reselection scanning can be adapted based on the kinetic fingerprint and radio modeling performed by TAC 210.

Figure 2B:
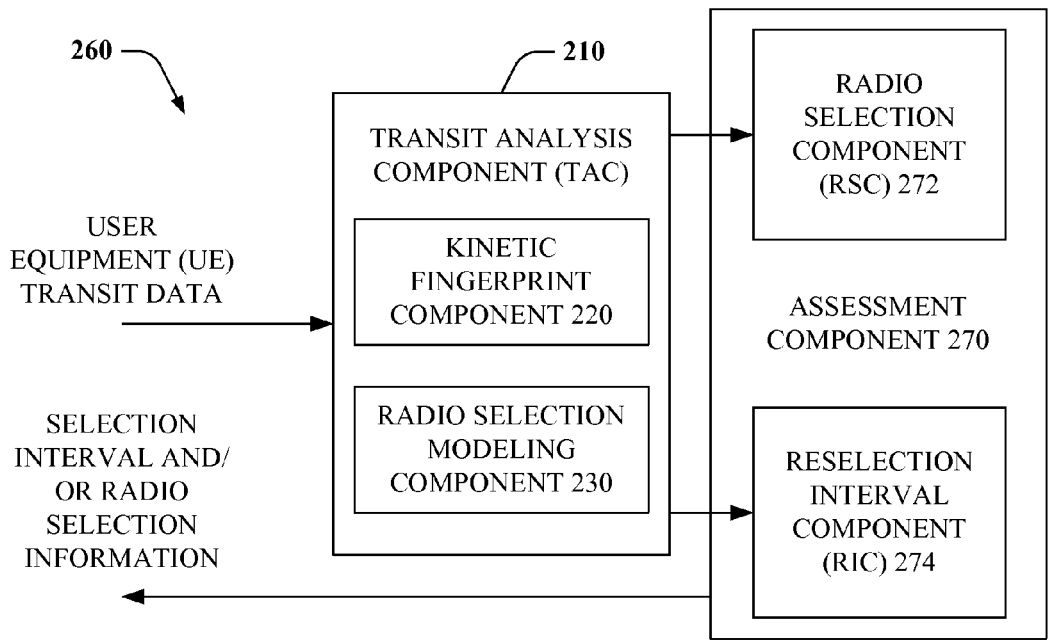
FIG. 2b is a block diagram of a system employing a kinetic fingerprint to select at least a radio technology or a reselection interval in accordance with aspects of the disclosed subject matter.

FIG. 2b is a block diagram of a system 260 employing a kinetic fingerprint to select at least a radio technology or a reselection interval in accordance with aspects of the disclosed subject matter. System 260 can be the same as, or similar to, system 200. System 260 can include TAC 210, Kinetic fingerprint component 220, and radio selection modeling component 230 as disclosed herein. System 260 can further include assessment component 270, which can be the same as, or similar to, the one or more assessment components disclosed in related application (U.S. Ser. No. 12/624, 643). Assessment component 270 can include RSC 272 which can be the same as, or similar to, RSC 240. Further, assessment component 270 can include RIC 274 which can be the same as, or similar to, RIC 250. As will be appreciated by one of skill in the related arts, wherein assessment component 270 includes one or both of RSC 272 or RIC 274, assessment component can facilitate access to selection interval and/or radio selection information.

Figure 3:
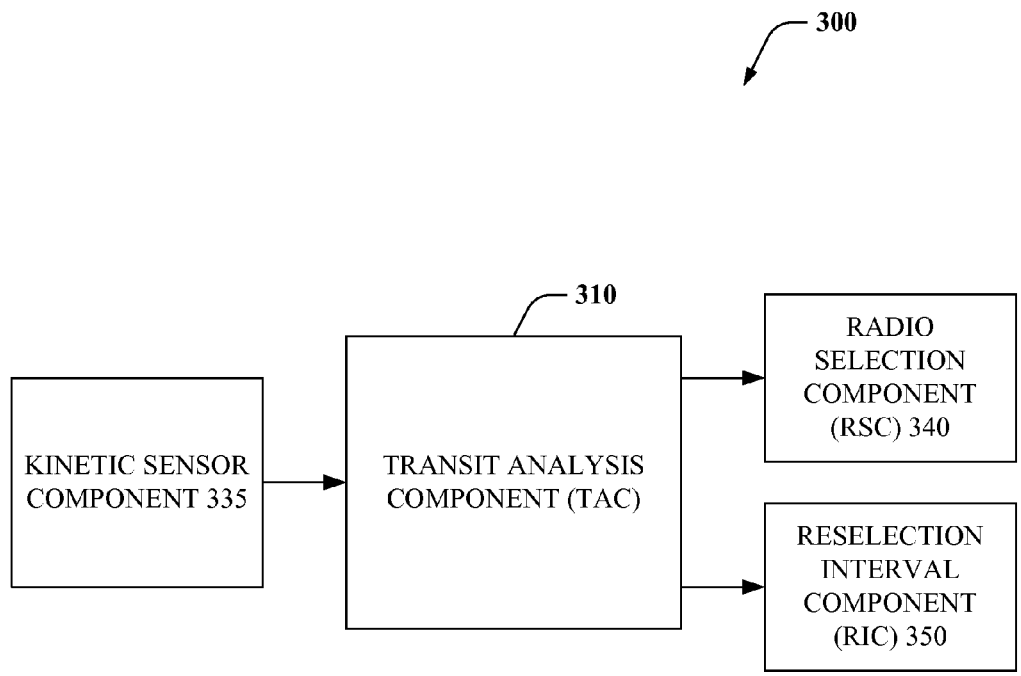
FIG. 3 is a block diagram of a system for motion adaptive user equipment employing a kinetic sensor in accordance with aspects described herein.

FIG. 3 is a block diagram of a system 300 for motion adaptive user equipment employing a kinetic sensor in accordance with aspects described herein. System 300 can be the same as, or similar to, system 100 or 200. System 300 can include TAC 310, RSC 340 and RIC 350 which can be the same as, or similar to, the corresponding components of system 100 or 200. Further system 200 can include kinetic sensor component 335. Kinetic sensor component 335 can source UE transit data. In an aspect, kinetic sensor component 335 can facilitate access to kinetic changes for a UE including changes in speed, velocity, or position as a function of time, historic kinetic data, kinetic data transformed in to the frequency domain, etc. A non-limiting example of kinetic sensor component 335 can be a five-axis capacitive accelerometer that executes a fast Fourier transform (FFT) and stores frequency data in a local memory that is accessible by TAC 310. A second non-limiting example of kinetic sensor component 335 can be a piezoelectric inertial sensor that sources a raw voltage measurement to TAC 310 (wherein TAC 310 can separately access a temporal framework to facilitate deduction of a change in speed). One of skill in the art will appreciate that numerous kinetic sensors of varying levels of complexity can be employed as kinetic sensor component 335 without departing form the scope of the subject disclosure. Further, it will be appreciated that any form of data, e.g., voltage, current, resistance, numerical, ratio, etc., can be employed by TAC 310 within the scope of the present disclosure.

Figure 4:
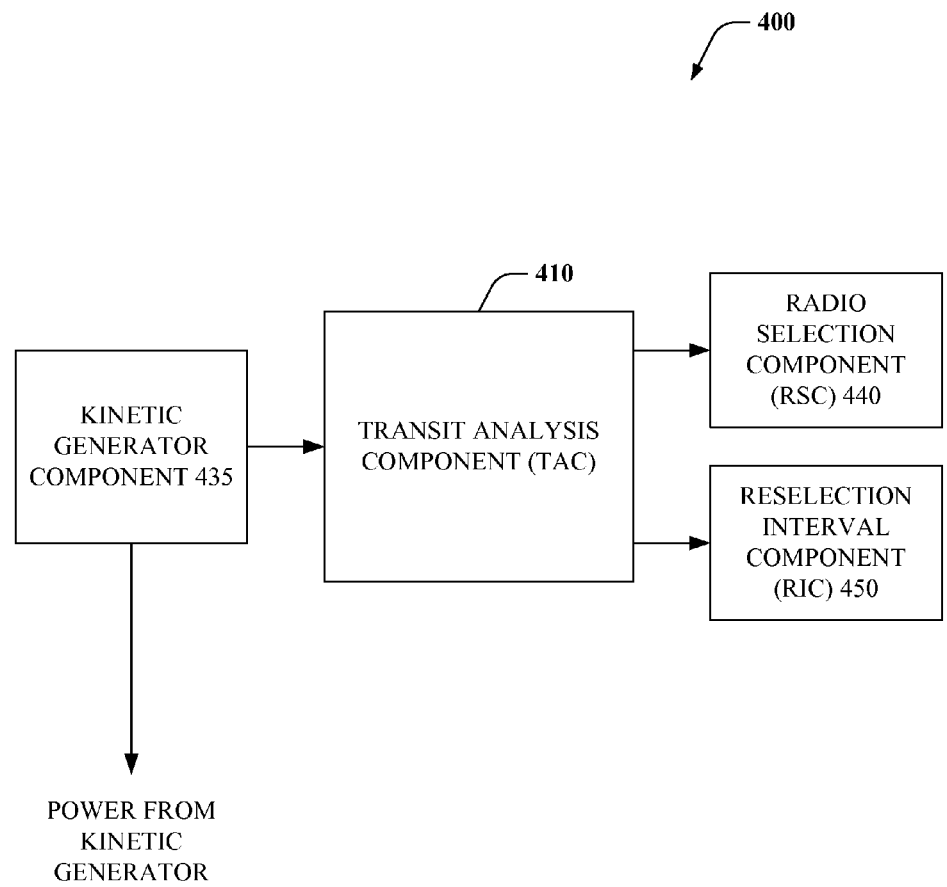
FIG. 4 is a block diagram of a system for motion adaptive user equipment employing a kinetic generator in accordance with aspects described herein.

FIG. 4 is a block diagram of a system 400 for motion adaptive user equipment employing a kinetic generator in accordance with aspects described herein. System 400 can be the same as, or similar to, system 100, 200, or 300. System 400 can include TAC 410, RSC 440 and RIC 450 which can be the same as, or similar to, the corresponding components of system 100, 200 or 300. System 400 can further include kinetic generator component 435. Kinetic generator component 435 can be the same as, or similar to, kinetic sensor component 335. Further, kinetic generator component 435 can include one or more kinetic sensors as sub-components of kinetic generator component 435.

In an aspect, kinetic generator component 435 can generate UE transit data contemporaneously with kinetic power generation. For example, a kinetic generator can generate power when it accelerates in a particular direction. This same acceleration can be closely associated with movement of the UE itself. As such, UE transit can be deduced or determined (or measured directly) from the output of a kinetic generator. As a non-limiting example, a kinetic generator can function as an accelerometer of sorts and, as such, three orthogonal kinetic generators can be adapted to generate power from movements in 3-D space. These same movements in 3-D space can be deduced or determined by monitoring the power generated in each axis. For example, movements in the X-axis can be measured as a function of current generated form an X-axis kinetic generator. As a second example, a capacitive measurement can be provided from the X-axis generator contemporaneously with the current generated, which capacitive measurement can be associated with movement in the X-direction as a function of time. One of skill in the art will appreciate that kinetic generators can provide the same, or similar, data as kinetic sensors with the added benefit of power generation. As such, a kinetic generator can offer an attractive option for accessing UE transit data with little or no negative effect on the battery life (UE resources) of a UE.

Figure 5:
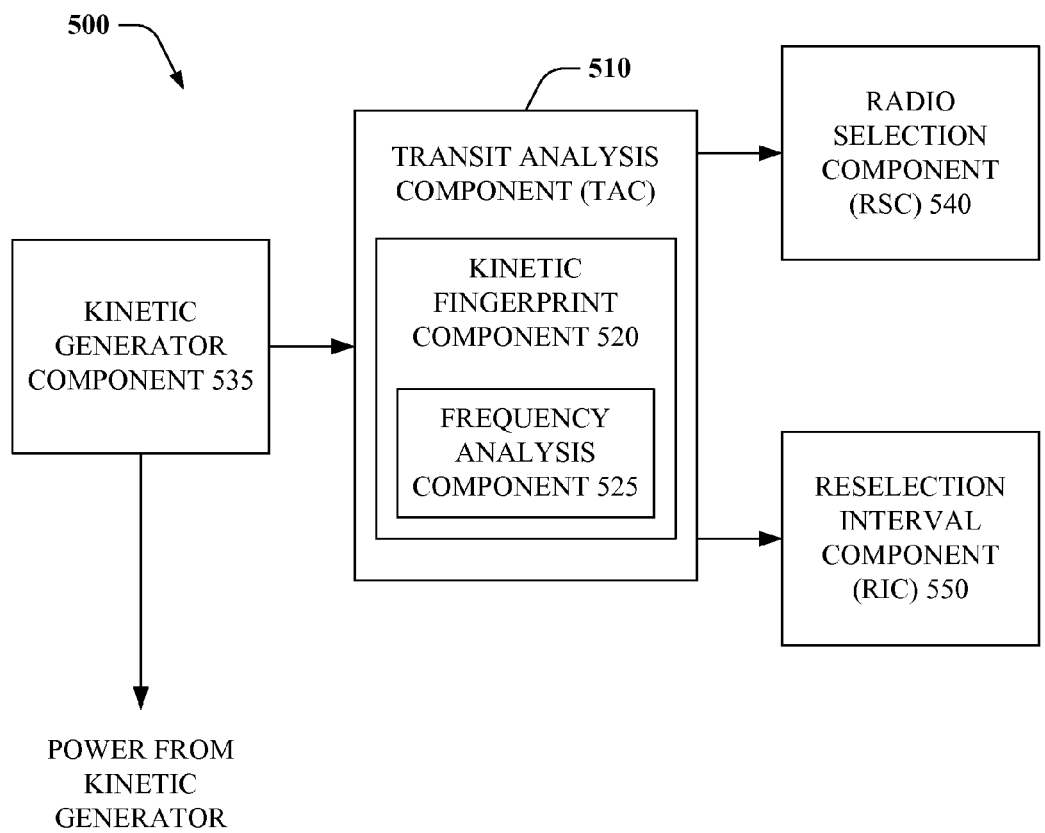
FIG. 5 is a block diagram of a system for motion adaptive user equipment employing frequency analysis technology in accordance with aspects described herein.

FIG. 5 is a block diagram of a system 500 for motion adaptive user equipment employing frequency analysis technology in accordance with aspects described herein. System 500 can be the same as, or similar to, system 100, 200, 300, or 400. System 500 can include TAC 510, kinetic generator 535, RSC 540 and RIC 550 which can be the same as, or similar to, the corresponding components of system 100, 200, 300 or 400. TAC 510 can further include kinetic fingerprint component 520 which can be the same as, or similar to, kinetic fingerprint component 220. Further, kinetic fingerprint component 520 can include frequency analysis component 525.

Frequency analysis component 525 can facilitate conversion between temporal domain UE transit data and frequency domain UE transit data, e.g., converting frequency data into temporal data or the reverse by FFT, etc. In an aspect, this can be advantageous wherein particular modes of UE transit can be strongly associated with highly periodic kinetic changes. For example, rail travel can be associate with very regular "bumps" as a train truck crosses over rail welds which are typically at highly regular intervals. As another example, the gait of a user walking with a UE can be very regular and the rise and fall of the body can be highly periodic. As a still further example, the high frequency vibrations or a turbine engine, e.g., a jet engine, can produce recognizable frequency patterns. As such, the frequency analysis component 525 can be readily employed in kinetic fingerprinting as disclosed herein.

Figure 6:
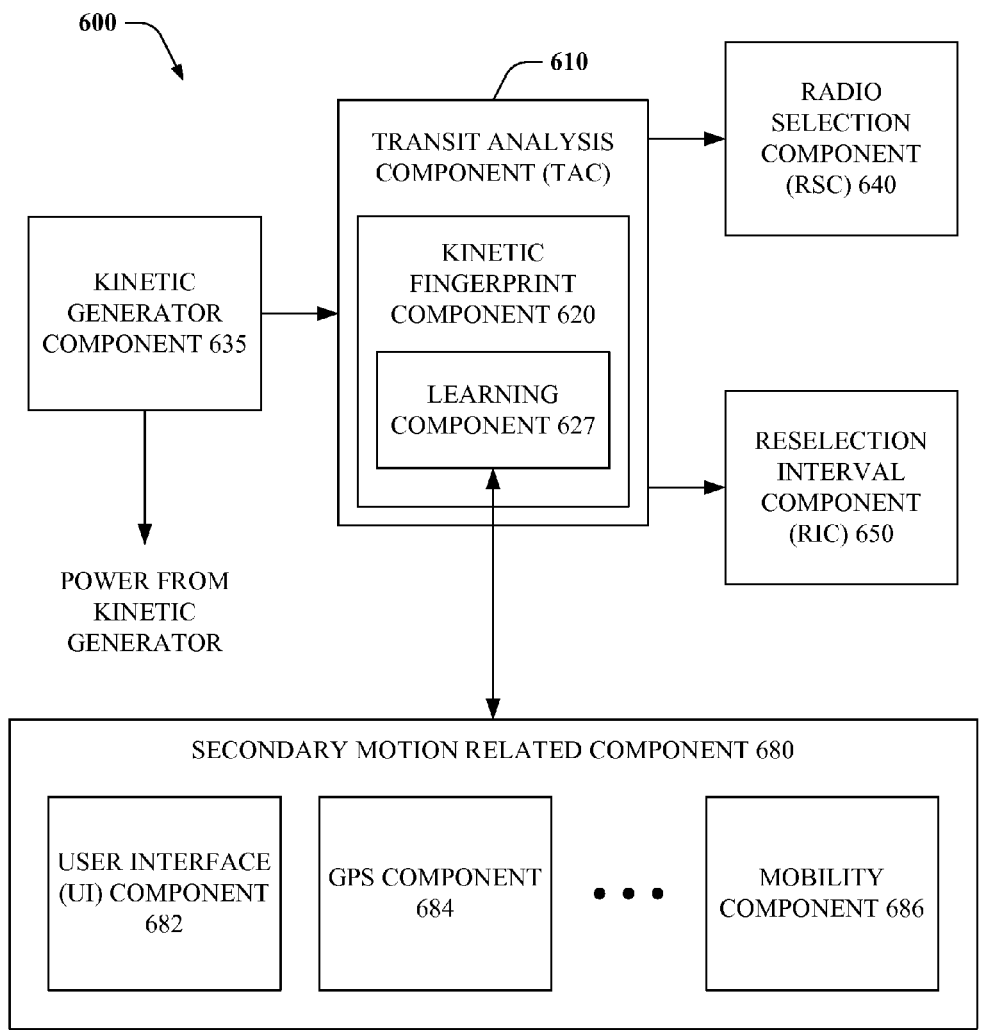
FIG. 6 is a block diagram of a system for motion adaptive user equipment employing learning technology in accordance with aspects described herein.

FIG. 6 is a block diagram of a system 600 for motion adaptive user equipment employing learning technology in accordance with aspects described herein. System 600 can be the same as, or similar to, system 100, 200, 300, 400 or 500. System 600 can include TAC 610, kinetic generator 635, RSC 640 and RIC 650 which can be the same as, or similar to, the corresponding components of system 100, 200, 300, 400 or 500. TAC 610 can further include kinetic fingerprint component 620 that can be the same as, or similar to, kinetic fingerprint component 220 or 520. Further, kinetic fingerprint component 620 can include learning component 627. Learning component 627 can facilitate intelligent behavior for TAC 610. In an aspect, learning component 627 can access additional data sources when UE transit data poorly matches the known kinetic fingerprint (s). As an example, a user can have a vibrating massage chair that can generate one or more sets of UE transit data that may not match any kinetic fingerprint of kinetic fingerprint component 620. In response, default values can be communicated to RSC 640 or RIC 650. Further, the response can trigger a learning mode in which, for example, the user interface asks prompts the user to input information relating to the particular UE transit data for the massage chair. Thus, when the massage chair is encountered in the future, the UE TAC 610 can respond appropriately. Numerous other examples of learning behavior are readily appreciated and are not presented for conciseness.

System 600 can further include secondary motion related component 680 communicatively coupled to learning component 627. Secondary motion related component 680 can include one or more secondary motion related sources. As such, when a learning opportunity occurs, learning component 627 can access supplementary data sources to facilitate determinations of preferential kinetic dependant behaviors, e.g., radio selection and reselection interval determination. These secondary sources can include, but are not limited to, user interface (UI) component 682, GPS component 684, or mobility component 686. UI component 682 can facilitate interaction with a user as a secondary data source, e.g., asking the user to define one or more parameters related to the detected kinetic data. GPS component 684 can source global position data to augment the UE transit data. Mobility component 686 can be the same as, or similar to, a mobility component as disclosed in related application (U.S. Ser. No. 12/624,643). It will be readily appreciated that the learning feature presently disclosed can facilitate rapid improvements in the performance of system 600. In a further aspect, learned information can be shared with other devices to improve their functionality, e.g., common libraries, user profiles, data agglomeration, etc.

Figure 7:
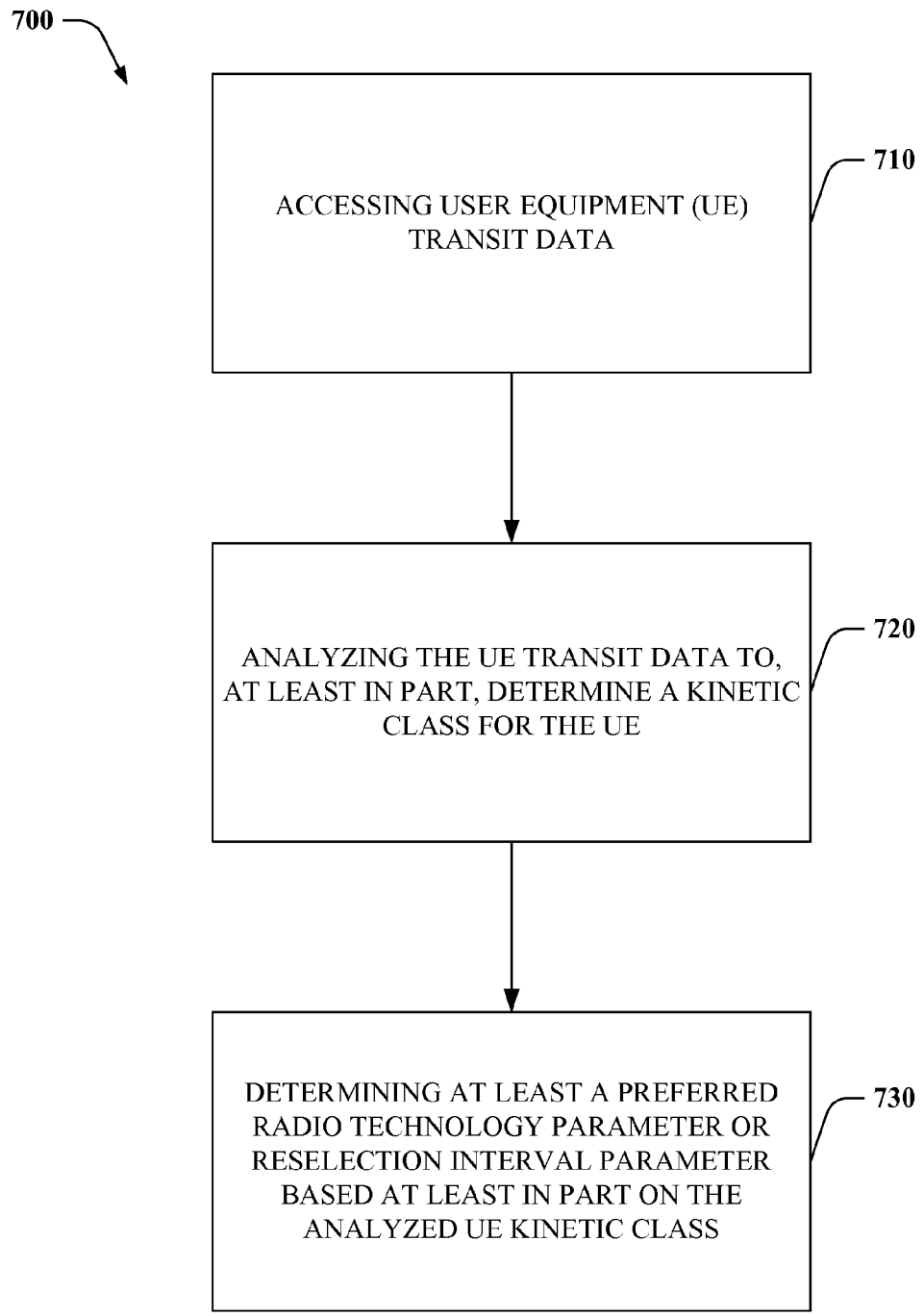
FIG. 7 is an exemplary flowchart of procedures defining a method for determining at least a preferential radio technology parameter or reselection interval parameter in accordance with aspects described herein.

FIG. 7 is an exemplary flowchart of procedures defining a method 700 for determining at least a preferential radio technology parameter or reselection interval parameter in accordance with aspects described herein. At 710, system 700 can access UE transit data. UE transit data can be information related to the movement of a UE. For example, UE data can be related to movement of a UE causing a kinetic generator to generate power in a UE. At 720, the US transit data can be analyzed to determine a kinetic class for the UE. The kinetic class can be associated with one or more characteristics of the UE transit data analyzed. For example, analysis of the UE transit data can indicate frequent acceleration and deceleration typically not exceeding 35 miles per hour (mph) and generally exceeding 15 mph. This can be classified as "city transit", e.g., by bike, car, bus, etc. At 730, a preferred radio technology or reselection interval parameter can be determined based, at least in part, on the UE kinetic class from 720. At this point method 700 can end.

Figure 8:
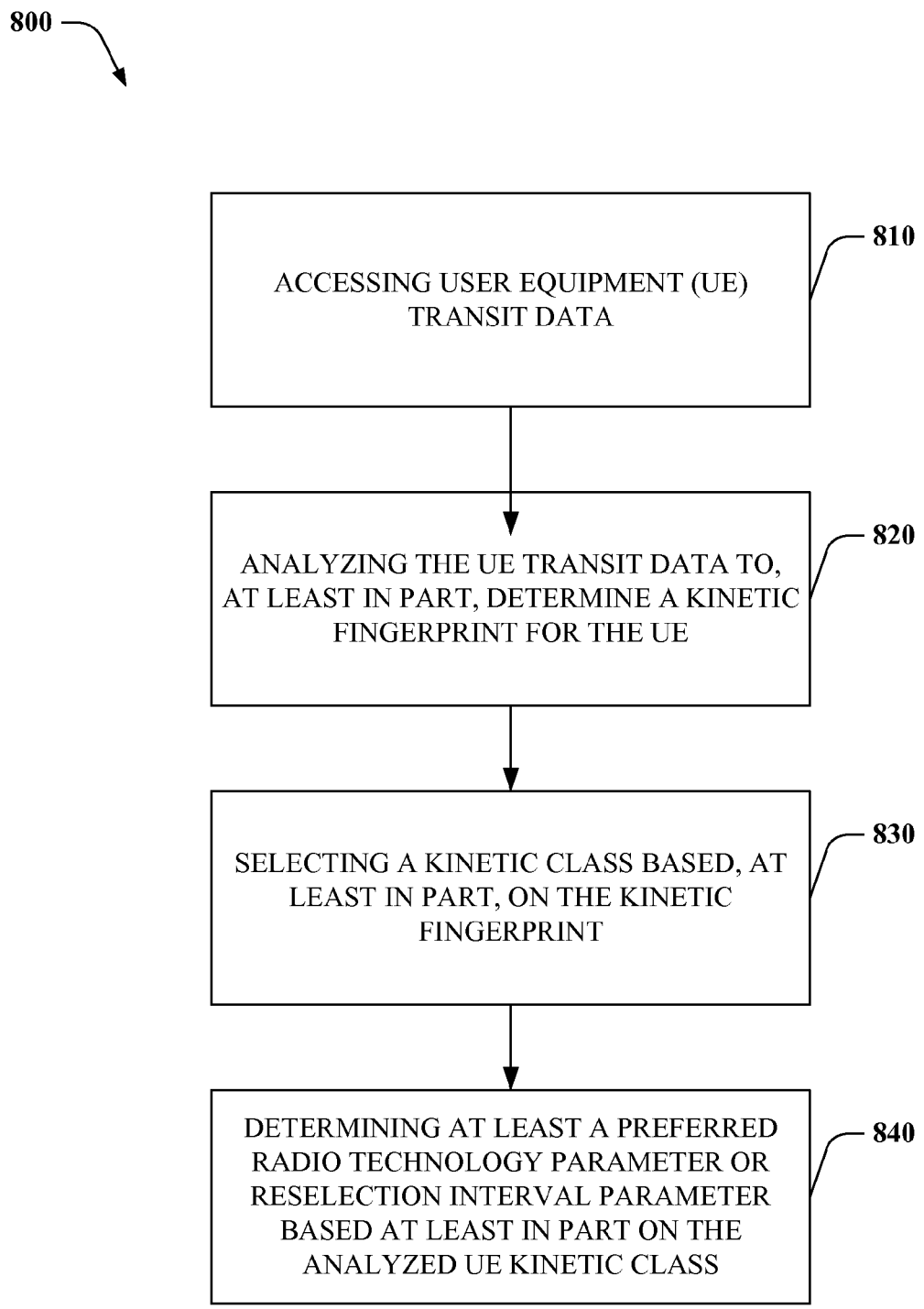
FIG. 8 is an exemplary flowchart of procedures defining a method for determining at least a preferential radio technology parameter or reselection interval parameter in accordance with aspects described herein.

FIG. 8 is an exemplary flowchart of procedures defining a method 800 for determining at least a preferential radio technology parameter or reselection interval parameter in accordance with aspects described herein. At 810, UE transit data can be accessed. At 820, the UE transit data can be analyzed to, at least in part, determine a kinetic fingerprint match for the UE transit data. Determinations of a kinetic fingerprint can provide additional assumptions about the UE transit data. For example, where a UE transit data set indicates speeds between 15 and 35 mph with frequent acceleration and deceleration, pauses after moving right, followed by vibrations at the beginning and end of each pause, e.g., from a door opening and closing, a fingerprint for a city bus can be matched (cf. to kinetic classification at 720). Where the city bus match is made, other assumptions can be made, for example, that the bus can have a mobile WiFi connection, as opposed to a car or taxi that is less likely to have a WiFi connection. Where the WiFi connection can be a possibility, subsequent appropriate actions can be taken to check for, and take advantage of, said resource.

At 830, a kinetic class can be selected based, at least in part, on a determined kinetic fingerprint from 820. The kinetic class can allow for simplification of radio selection and reselection interval information. The kinetic classes can be as granular as the kinetic fingerprints, e.g., for each fingerprint there is a corresponding class, or can be of higher granularity, e.g., for every 10 fingerprints there is one corresponding class, etc. At 840, a preferred radio technology or reselection interval parameter can be determined based, at least in part, on the UE kinetic class from 830. At this point method 800 can end.

Figure 9:
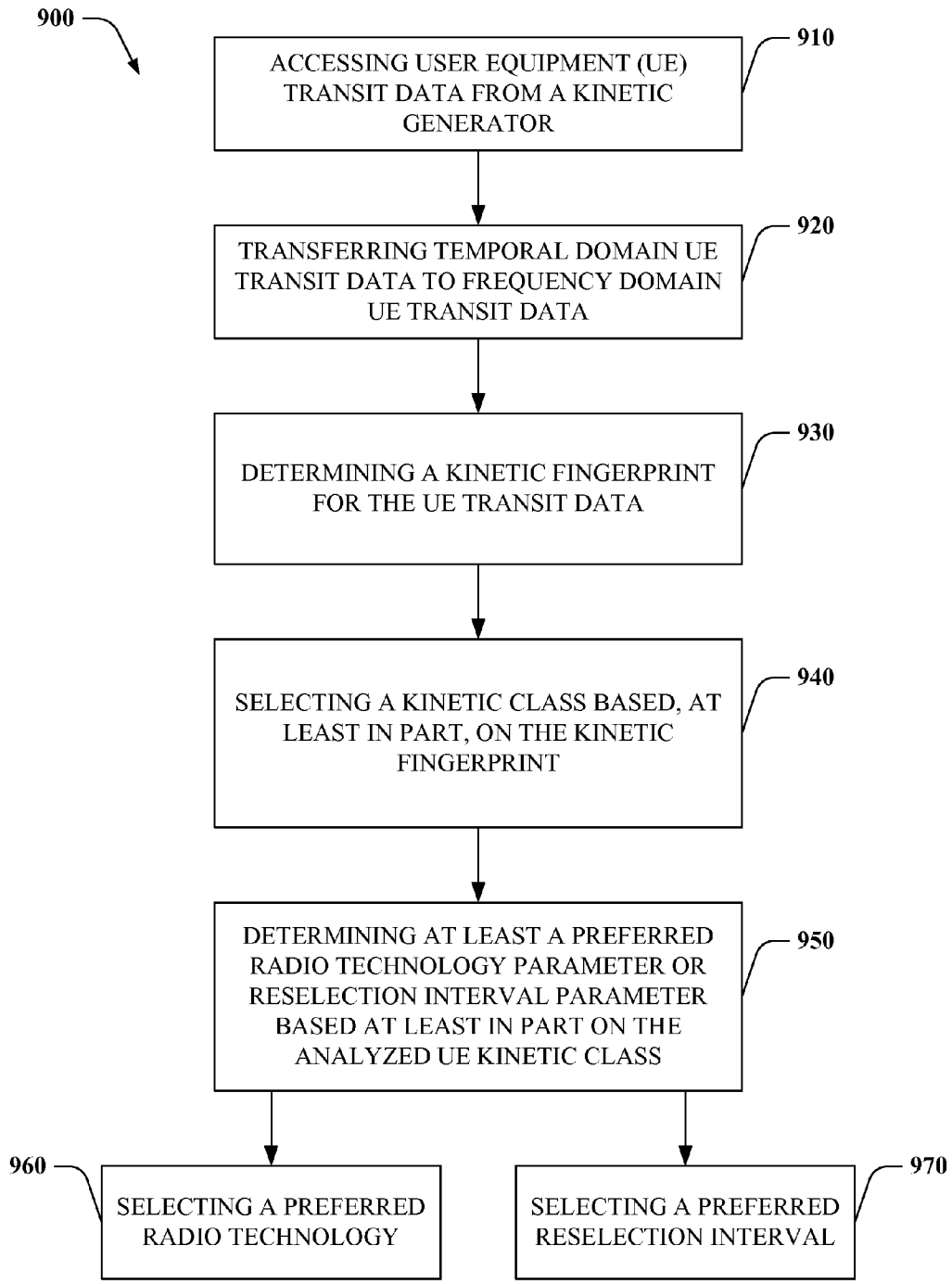
FIG. 9 is an exemplary flowchart of procedures defining a method for determining at least a preferential radio technology parameter or reselection interval parameter in accordance with aspects described herein.

FIG. 9 is an exemplary flowchart of procedures defining a method 900 for determining at least a preferential radio technology parameter or reselection interval parameter in accordance with aspects described herein. At 910, UE transit data can be accessed form a kinetic generator. At 920 kinetic generator UE data can be transferred between the temporal and frequency domain, e.g., by FFT, etc., as appropriate. At 930, a kinetic fingerprint can be determined for the UE transit data. Where a match cannot be positively determined, one or more default kinetic fingerprints can be employed. At 940, a kinetic class can be selected based in part on the kinetic fingerprint from 930.

At 950, a preferred radio technology or reselection interval parameter can be determined based, at least in part, on the UE kinetic class from 940. At 960 a preferred radio technology (or radio) can be selected. At 970, a preferred reselection interval can be selected. At this point method 900 can end.

Figure 10:
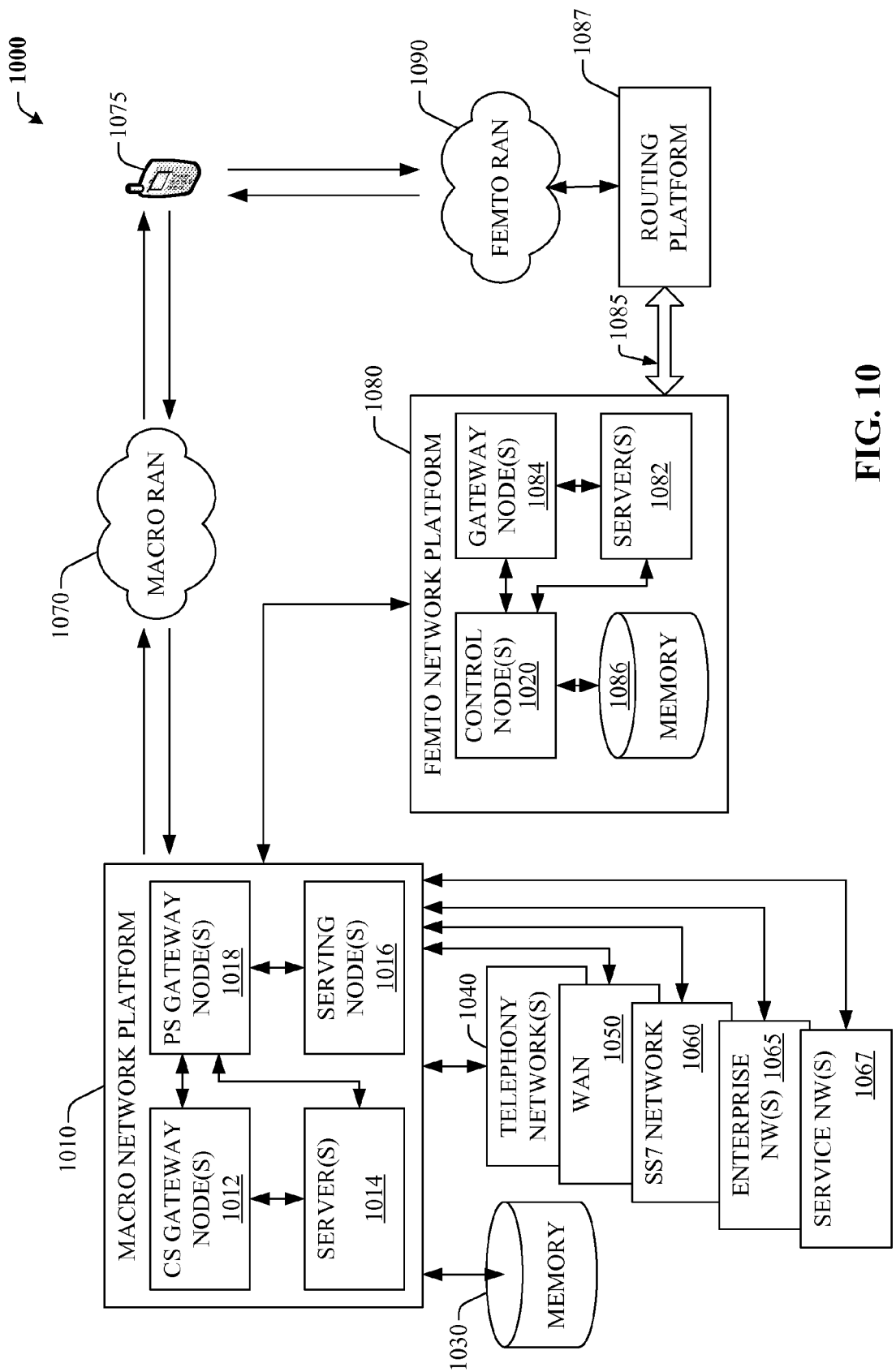
FIG. 10 illustrates an exemplary wireless communications environment with associated components that can enable operation of an enterprise network in accordance with aspects of the disclosed subject matter.

To provide further context for various aspects of the subject specification, FIG. 10 illustrates an example wireless communication environment 1000, with associated components that can enable operation of a femtocell enterprise network in accordance with aspects described herein. Wireless communication environment 1000 includes two wireless network platforms: (i) A macro network platform 1010 that serves, or facilitates communication) with user equipment 1075 via a macro radio access network (RAN) 1070. It should be appreciated that in cellular wireless technologies, e.g., 4G, 3GPP UMTS, HSPA, 3GPP LTE, 3GPP UMB, macro network platform 1010 is embodied in a Core Network. (ii) A femto network platform 1080, which can provide communication with UE 1075 through a femto RAN 1090, linked to the femto network platform 1080 through a routing platform 102 via backhaul pipe(s) 1085, wherein backhaul pipe(s) are substantially the same a backhaul link 3853 below. It should be appreciated that femto network platform 1080 typically offloads UE 1075 from macro network, once UE 1075 attaches, e.g., through macro-to-femto handover, or via a scan of channel resources in idle mode, to femto RAN.

It is noted that RAN includes base station(s), or access point(s), and its associated electronic circuitry and deployment site(s), in addition to a wireless radio link operated in accordance with the base station(s). Accordingly, macro RAN 1070 can comprise various coverage cells like cell 1205, while femto RAN 1090 can comprise multiple femto access points. As mentioned above, it is to be appreciated that deployment density in femto RAN 1090 is substantially higher than in macro RAN 1070.

Generally, both macro and femto network platforms 1010 and 1080 include components, e.g., nodes, gateways, interfaces, servers, or platforms, that facilitate both packet-switched (PS), e.g., internet protocol (IP), frame relay, asynchronous transfer mode (ATM), and circuit-switched (CS) traffic, e.g., voice and data, and control generation for networked wireless communication. In an aspect of the subject innovation, macro network platform 1010 includes CS gateway node(s) 1012 which can interface CS traffic received from legacy networks like telephony network(s) 1040, e.g., public switched telephone network (PSTN), or public land mobile network (PLMN), or a SS7 network 1060. Circuit switched gateway 1012 can authorize and authenticate traffic, e.g., voice, arising from such networks. Additionally, CS gateway 1012 can access mobility, or roaming, data generated through SS7 network 1060; for instance, mobility data stored in a VLR, which can reside in memory 1030. Moreover, CS gateway node(s) 1012 interfaces CS-based traffic and signaling and gateway node(s) 1018. As an example, in a 3GPP UMTS network, gateway node(s) 1018 can be embodied in gateway GPRS support node(s) (GGSN).

In addition to receiving and processing CS-switched traffic and signaling, gateway node(s) 1018 can authorize and authenticate PS-based data sessions with served, e.g., through macro RAN, wireless devices. Data sessions can include traffic exchange with networks external to the macro network platform 1010, like wide area network(s) (WANs) 1050; it should be appreciated that local area network(s) (LANs) can also be interfaced with macro network platform 1010 through gateway node(s) 1018. Gateway node(s) 1018 generates packet data contexts when a data session is established. To that end, in an aspect, gateway node(s) 1018 can include a tunnel interface, e.g., tunnel termination gateway (TTG) in 3GPP UMTS network(s); not shown, which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), gateway node(s) 1018, e.g., GGSN, and tunnel interface, e.g., TTG, comprise a packet data gateway (PDG).

Macro network platform 1010 also includes serving node(s) 1016 that convey the various packetized flows of information or data streams, received through gateway node(s) 1018. As an example, in a 3GPP UMTS network, serving node(s) can be embodied in serving GPRS support node(s) (SGSN).

As indicated above, server(s) 1014 in macro network platform 1010 can execute numerous applications, e.g., location services, online gaming, wireless banking, wireless device management, etc., that generate multiple disparate packetized data streams or flows, and manage, e.g., schedule, queue, format, etc., such flows. Such application(s), for example can include add-on features to standard services provided by macro network platform 1010. Data streams can be conveyed to gateway node(s) 1018 for authorization/authentication and initiation of a data session, and to serving node(s) 1016 for communication thereafter. Server(s) 1014 can also effect security, e.g., implement one or more firewalls, of macro network platform 1010 to ensure network's operation and data integrity in addition to authorization and authentication procedures that CS gateway node(s) 1012 and gateway node(s) 1018 can enact. Moreover, server(s) 1014 can provision services from external network(s), e.g., WAN 1050, or Global Positioning System (GPS) network(s) (not shown). It is to be noted that server(s) 1014 can include one or more processor configured to confer at least in part the functionality of macro network platform 1010. To that end, the one or more processor can execute code instructions stored in memory 1030, for example.

In example wireless environment 1000, memory 1030 stores information related to operation of macro network platform 1010. Information can include business data associated with subscribers; market plans and strategies, e.g., promotional campaigns, business partnerships; operational data for mobile devices served through macro network platform; service and privacy policies; end-user service logs for law enforcement; and so forth. Memory 1030 can also store information from at least one of telephony network(s) 1040, WAN(s) 1050, or SS7 network 1060, enterprise NW(s) 1065, or service NW(s) 1067.

Femto gateway node(s) 1084 have substantially the same functionality as PS gateway node(s) 1018. Additionally, femto gateway node(s) 1084 can also include substantially all functionality of serving node(s) 1016. In an aspect, femto gateway node(s) 1084 facilitates handover resolution, e.g., assessment and execution. Further, control node(s) 1020 can receive handover requests and relay them to a handover component (not shown) via gateway node(s) 1084. According to an aspect, control node(s) 1020 can support RNC capabilities.

Server(s) 1082 have substantially the same functionality as described in connection with server(s) 1014. In an aspect, server(s) 1082 can execute multiple application(s) that provide service, e.g., voice and data, to wireless devices served through femto RAN 1090. Server(s) 1082 can also provide security features to femto network platform. In addition, server(s) 1082 can manage, e.g., schedule, queue, format, etc., substantially all packetized flows, e.g., IP-based, frame relay-based, ATM-based, it generates in addition to data received from macro network platform 1010. It is to be noted that server(s) 1082 can include one or more processor configured to confer at least in part the functionality of macro network platform 1010. To that end, the one or more processor can execute code instructions stored in memory 1086, for example.

Memory 1086 can include information relevant to operation of the various components of femto network platform 1080. For example operational information that can be stored in memory 1086 can comprise, but is not limited to, subscriber information; contracted services; maintenance and service records; femto cell configuration, e.g., devices served through femto RAN 1090; access control lists, or white lists; service policies and specifications; privacy policies; add-on features; and so forth.

It is noted that femto network platform 1080 and macro network platform 1010 can be functionally connected through one or more reference link(s) or reference interface(s). In addition, femto network platform 1080 can be functionally coupled directly (not illustrated) to one or more of external network(s) 1040, 1050, 1060, 1065 or 1067. Reference link(s) or interface(s) can functionally link at least one of gateway node(s) 1084 or server(s) 1086 to the one or more external networks 1040, 1050, 1060, 1065 or 1067.

Figure 11:
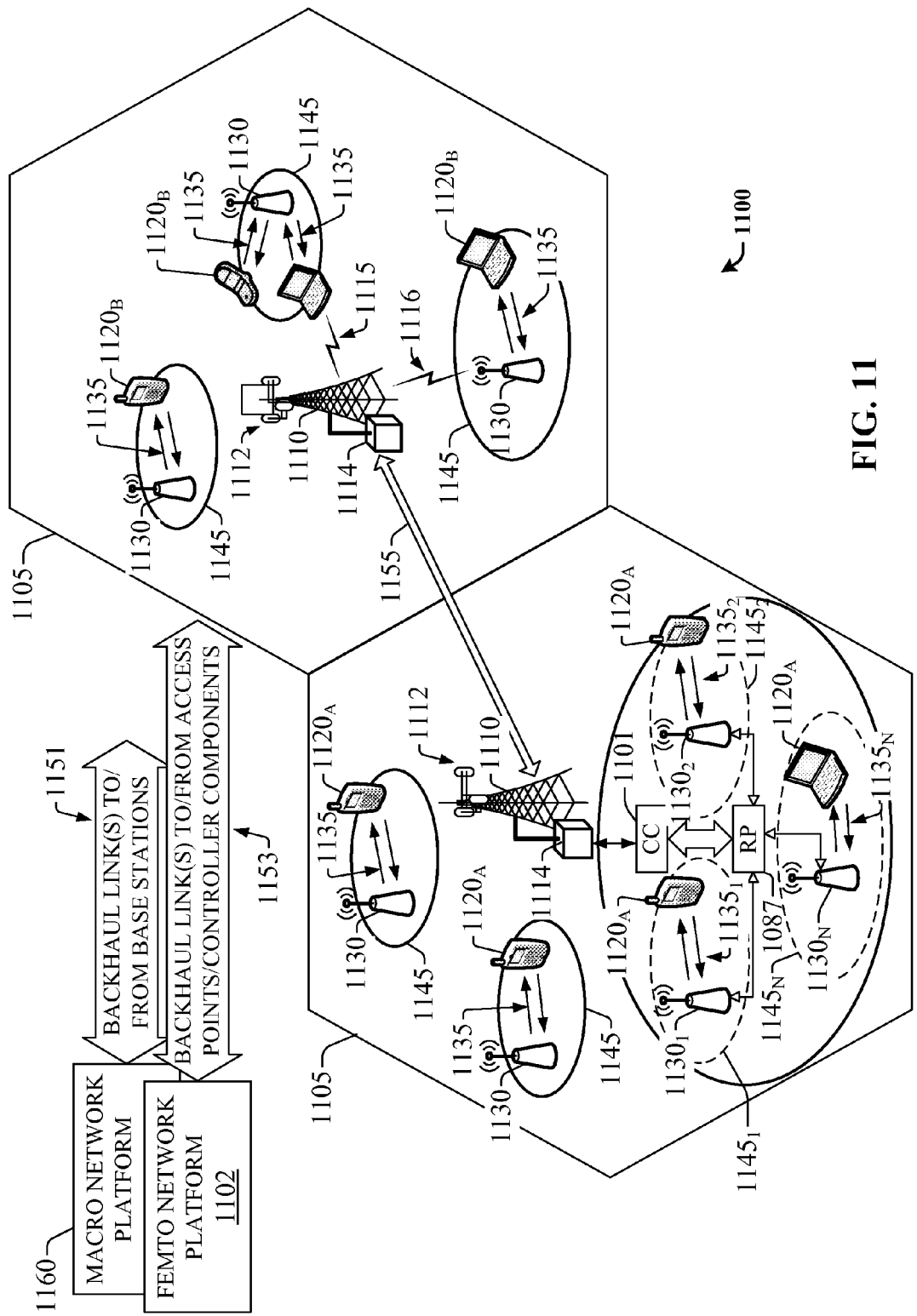
FIG. 11 illustrates a schematic deployment of a macro cell for wireless coverage in accordance with aspects of the subject specification.

FIG. 11 illustrates a wireless environment that includes macro cells and femtocells for wireless coverage in accordance with aspects described herein. In wireless environment 1150, two areas 1105 represent "macro" cell coverage; each macro cell is served by a base station 1110. It can be appreciated that macro cell coverage area 1105 and base station 1110 can include functionality, as more fully described herein, for example, with regard to system 1100. Macro coverage is generally intended to serve mobile wireless devices, like UE $1120_A$, $1120_B$, in outdoors locations. An over-the-air wireless link 115 provides such coverage, the wireless link 1215 comprises a downlink (DL) and an uplink (UL), and utilizes a predetermined band, licensed or unlicensed, of the radio frequency (RF) spectrum. As an example, UE $1120_A$, $1120_E$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1110 communicates via backhaul link(s) 1151 with a macro network platform 1160, which in cellular wireless technologies, e.g., 3rd Generation Partnership Project (3GPP) Universal Mobile Telecommunication System (UMTS), Global System for Mobile Communication (GSM), represents a core network.

In an aspect, macro network platform 1160 controls a set of base stations 1110 that serve either respective cells or a number of sectors within such cells. Base station 1110 comprises radio equipment 1114 for operation in one or more radio technologies, and a set of antennas 1112, e.g., smart antennas, microwave antennas, satellite dish(es), etc., that can serve one or more sectors within a macro cell 1105. It is noted that a set of radio network control node(s), which can be a part of macro network platform; a set of base stations, e.g., Node B 1110, that serve a set of macro cells 1105; electronics, circuitry or components associated with the base stations in the set of base stations; a set of respective OTA wireless links, e.g., links 1115 or 1116, operated in accordance to a radio technology through the base stations; and backhaul link(s) 1155 and 1151 form a macro radio access network (RAN). Macro network platform 1160 also communicates with other base stations (not shown) that serve other cells (not shown). Backhaul link(s) 1151 or 1153 can include a wired backbone link, e.g., optical fiber backbone, twisted-pair line, T1/E1 phone line, a digital subscriber line (DSL) either synchronous or asynchronous, an asymmetric ADSL, or a coaxial cable, etc., or a wireless, e.g., line-of-sight (LOS) or non-LOS, backbone link. Backhaul pipe(s) 1155 link disparate base stations 1110. According to an aspect, backhaul link 1153 can connect multiple femto access points 1130 and/or controller components (CC) 1101 to the femto network platform 1102. In one example, multiple femto APs can be connected to a routing platform (RP) 1087, which in turn can be connect to a controller component (CC) 1101. Typically, the information from UEs $1120_A$ can be routed by the RP 102, for example, internally, to another UE $1120_A$ connected to a disparate femto AP connected to the RP 1087, or, externally, to the femto network platform 1102 via the CC 1101.

In wireless environment 1150, within one or more macro cell(s) 1105, a set of femtocells 1145 served by respective femto access points (APs) 1130 can be deployed. It can be appreciated that, aspects of the subject innovation are geared to femtocell deployments with substantive femto AP density, e.g., $10^4$-$10^7$ femto APs 1130 per base station 1110. According to an aspect, a set of femto access points $1130_1$-$3730_N$, with N a natural number, can be functionally connected to a routing platform 1087, which can be functionally coupled to a controller component 1101. The controller component 1101 can be operationally linked to the femto network platform 330 by employing backhaul link(s) 1153. Accordingly, UEs UE $3720_A$ connected to femto APs $1130_1$-$3830_N$ can communicate internally within the femto enterprise via the routing platform (RP) 1087 and/or can also communicate with the femto network platform 1102 via the RP 1087, controller component 1101 and the backhaul link(s) 1153. It can be appreciated that although only one femto enterprise is depicted in FIG. 11, multiple femto enterprise networks can be deployed within a macro cell 1105.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

Figure 12:
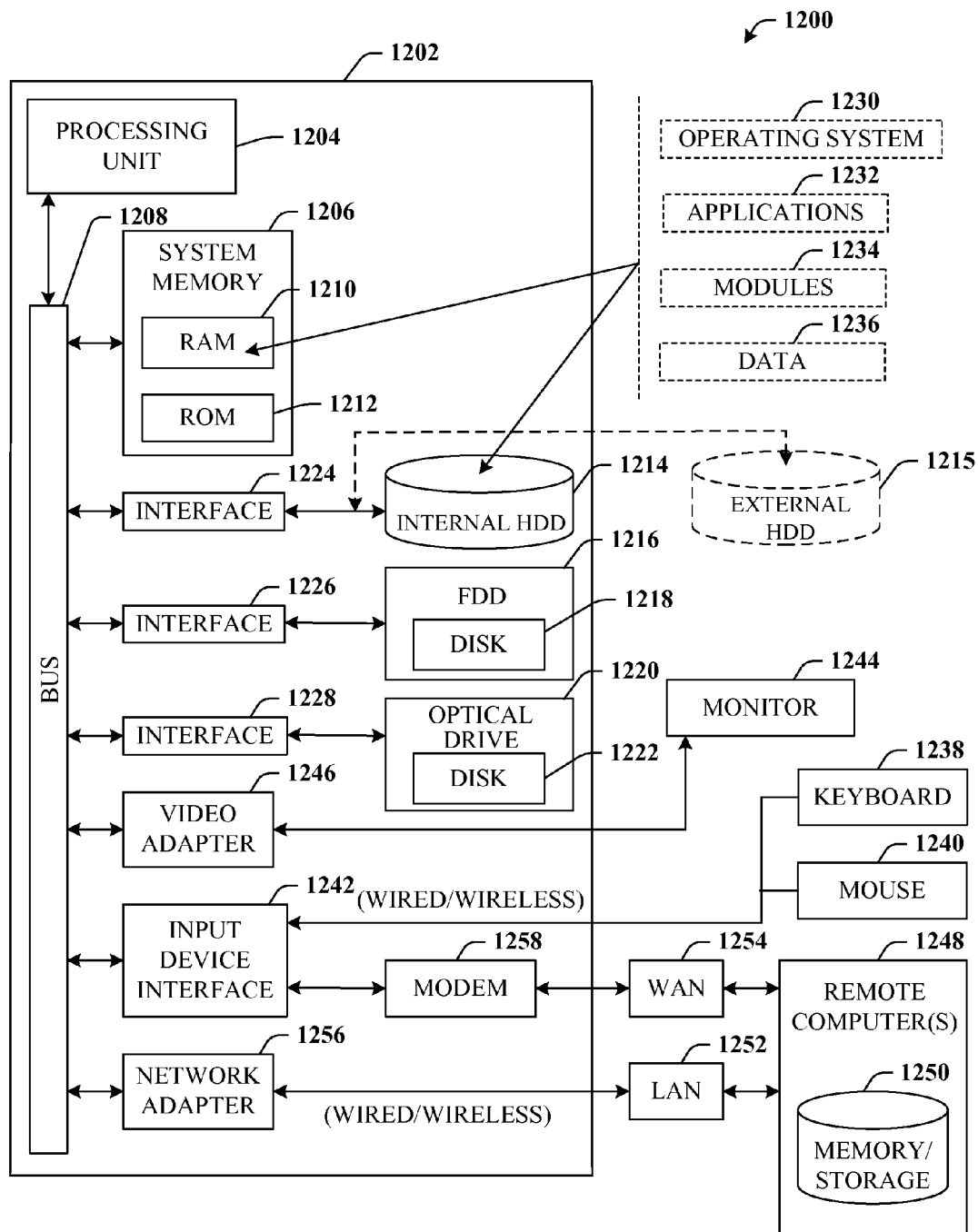
FIG. 12 illustrates a block diagram of a computer operable to execute a portion of the disclosed architecture.

Referring now to FIG. 12, there is illustrated a block diagram of an exemplary computer system operable to execute the disclosed architecture. In order to provide additional context for various aspects of the disclosed subject matter, FIG. 12 and the following discussion are intended to provide a brief, general description of a suitable computing environment 1200 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices. As a non-limiting example, kinetic fingerprint component 520 can be located in the cloud or in the UE. As a further non-limiting example, the various sub-components of secondary motion related component 680 can be embodied on the UE, in the cloud, on a user PC, or combinations thereof, etc.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the exemplary environment 1200 for implementing various aspects of the disclosed subject matter includes a computer 1202, the computer 1202 including a processing unit 1204, a system memory 1206 and a system bus 1208. The system bus 1208 couples to system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214, e.g., EIDE, SATA, which internal hard disk drive 1214 may also be configured for external use in a suitable chassis, e.g., 1215, a magnetic floppy disk drive (FDD) 1216, e.g., to read from or write to a removable diskette 1218, and an optical disk drive 1220, e.g., reading a CD-ROM disk 1222 or, to read from or write to other high capacity optical media such as the DVD. The hard disk drive 1214 (or 1215), magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the disclosed subject matter can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, a mobile device, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag, e.g., a kiosk, news stand, restroom, etc., and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11(a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices, e.g., hard disk, floppy disk, magnetic strips, etc., optical disks, e.g., compact disc (CD), digital versatile disc (DVD), blu-ray disc (BD), etc., smart cards, and flash memory devices, e.g., card, stick, key drive, etc. Additionally it should be appreciated that a carrier wave can be employed to carry computer-readable electronic data such as those used in transmitting and receiving electronic mail or in accessing a network such as the internet or a local area network (LAN). Of course, those skilled in the art will recognize many modifications may be made to this configuration without departing from the scope or spirit of the disclosed subject matter.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, comprising:
a memory to store computer-executable instructions; and
a processor, communicatively coupled to the memory, that facilitates execution of the computer-executable instructions to perform operations comprising:
receiving user equipment transit data based on an analysis of power generated from a movement of a kinetic generator of the user equipment;
determining a level of correlation between a kinetic pattern and a user equipment movement pattern determined from the user equipment transit data, wherein the kinetic pattern includes characteristic user equipment movement features for a predetermined user equipment transit mode, and wherein the level of correlation is indicative of a value of the user equipment movement pattern matching a criterion corresponding to a feature of the characteristic user equipment movement features of the kinetic pattern; and
determining radio selection information based on the user equipment movement pattern determined from the user equipment transit data.

2. The system of claim 1, wherein the operations further comprise:
determining reselection interval information of a user equipment radio based, at least in part, on the user equipment movement pattern determined from the user equipment transit data; and
facilitating access to the reselection interval information.

3. The system of claim 1, wherein the characteristic user equipment movement features of the kinetic pattern a speed, an acceleration, a deceleration, a momentum, a vibration, a voltage, a current, an electrical resistance, a capacitance, and a frequency.

4. The system of claim 1, wherein a value of the user equipment movement pattern is based, at least in part, on a transformation of the user equipment movement pattern between a time domain and a frequency domain, including application of a fast Fourier transform function.

5. The system of claim 1, wherein the operations further comprise:
designating a radio selection schema based, at least in part, on the level of correlation between the kinetic pattern and the user equipment movement pattern, wherein the radio selection schema includes an indicator of a predefined selection of a user equipment radio.

6. The system of claim 5, wherein a predetermined default radio selection schema of the radio selection schema is designated in response to the level of correlation between the kinetic pattern and the user equipment movement pattern not being indicative of a match of the kinetic pattern with the user equipment movement pattern.

7. The system of claim 1, wherein the operations further comprise:
selecting a user equipment radio based, at least in part, on the radio selection information.

8. The system of claim 2, wherein the operations further comprise:
designating, based at least in part on the reselection interval information, an interval for a reselection scanning schedule.

9. The system of claim 1, wherein the user equipment transit data is determined from an analysis of a voltage level that varies in time as a function of the movement of the kinetic generator of the user equipment.

10. The system of claim 1, wherein the operations further comprise:
facilitating a determination of the user equipment transit data, based, at least in part, on the analysis of the power generated by the movement of the kinetic generator.

11. The system of claim 1, wherein the user equipment transit data is determined from an analysis of an electrical current level that varies in time as a function of the movement of the kinetic generator of the user equipment.

12. The system of claim 1, wherein the operations further comprise:
receiving secondary motion related data to adapt the kinetic pattern or generate a new kinetic pattern.

13. The system of claim 12, wherein the secondary motion related data includes global positioning system data.

14. A method, comprising:
receiving, by a system including a processor, user equipment transit data based on an analysis of power generated from a movement of a kinetic generator of the user equipment;
determining, by the system, membership of the user equipment in a kinetic class, based on the user equipment transit data;
determining, by the system, a level of correlation between a kinetic pattern and a user equipment movement pattern determined from the user equipment transit data, wherein the kinetic pattern includes characteristic user equipment movement features for a predetermined user equipment transit mode, and wherein the level of correlation is indicative of a value of the user equipment movement pattern matching a criterion corresponding to a feature of the characteristic user equipment movement features of the kinetic pattern; and determining, by the system, based on the kinetic class, a radio technology parameter related to selection of a user equipment radio.

15. The method of claim 14, further comprising:
determining, by the system, based at least in part on the kinetic class, a reselection interval parameter related to a preferential reselection scanning schedule interval of the user equipment radio.

16. The method of claim 14, further comprising:
determining, by the system, the user equipment movement pattern.

17. The method of claim 14, further comprising:
receiving, by the system, the user equipment transit data from the kinetic generator; and
transforming, by the system, the user equipment transit data between a temporal domain and a frequency domain, including transforming by way of a fast Fourier transform function.

18. A tangible computer-readable medium storing computer-executable instructions that, in response to execution, cause a system including a processor to perform operations, comprising:
receiving user equipment transit data based, at least in part, on an analysis of power generated from a movement of a kinetic generator of the user equipment;
transforming user equipment transit data between a temporal domain and a frequency domain;
determining a user equipment movement pattern based, at least in part, on the user equipment transit data, to facilitate determining a correlation between the user equipment movement pattern and a kinetic pattern;
determining a level of the correlation between the kinetic pattern and the user equipment movement pattern, wherein the kinetic pattern includes characteristic user equipment movement features for a predetermined user equipment transit mode, and wherein the level of correlation is indicative of a value of the user equipment movement pattern matching a criterion corresponding to a feature of the characteristic user equipment movement features of the kinetic pattern; and
determining, based, at least in part, on the correlation, a radio technology parameter related to selection of a user equipment radio.

19. The tangible computer-readable medium of claim 18, wherein the operations further comprise:
determining, based on a kinetic class indicated for the user equipment, a reselection interval parameter related to a preferential reselection scanning schedule interval of the user equipment radio.

20. The tangible computer-readable storage medium of claim 18, wherein the operations further comprise:
receiving the user equipment transit data from the kinetic generator; and
transforming the user equipment transit data between a temporal domain and a frequency domain applying a Fourier transform.

* * * * *